Figure 1:
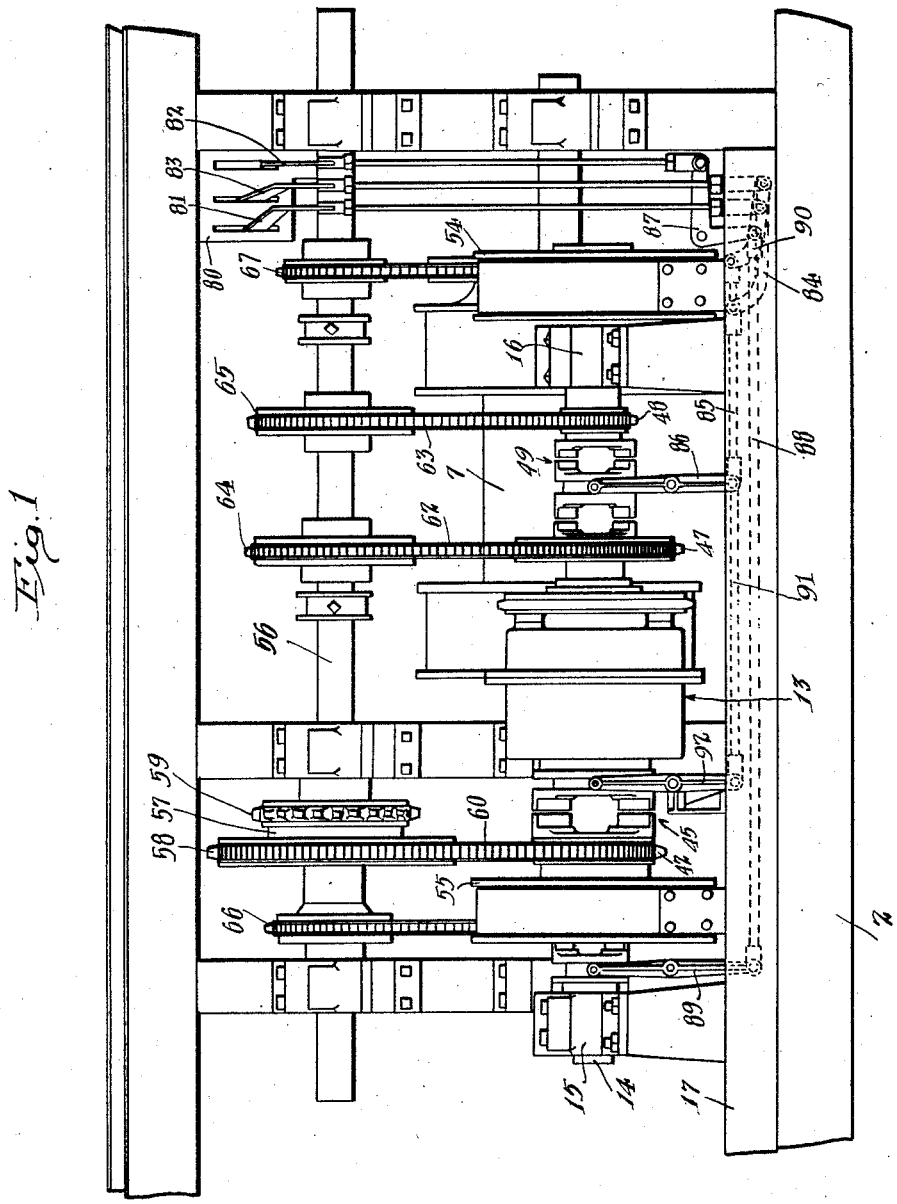

April 24, 1928.   1,667,181

L. E. ZERBE ET AL

DIFFERENTIAL GEAR MECHANISM

Original Filed April 30, 1925   3 Sheets-Sheet 1

Inventor
Lewis E. Zerbe
Merton J. Archer
By Lyon & Lyon
Attorneys

April 24, 1928.

L. E. ZERBE ET AL 1,667,181

DIFFERENTIAL GEAR MECHANISM

Original Filed April 30, 1925   3 Sheets-Sheet 3

Inventor
Lewis E. Zerbe
Merton J. Archer
By Lyon v Lyon
Attorneys

Patented Apr. 24, 1928.

1,667,181

UNITED STATES PATENT OFFICE.

LEWIS E. ZERBE, OF MONETA, CALIFORNIA, AND MERTON T. ARCHER, OF PITTSBURGH, PENNSYLVANIA.

DIFFERENTIAL-GEAR MECHANISM.

Original application filed April 30, 1925, Serial No. 26,880. Divided and this application filed May 11, 1926. Serial No. 108,256.

This invention relates to a differential gear mechanism and refers particularly to a differential gear mechanism in which the intermediate gears are intended to be rapidly and continuously planetated in use, the differential gear mechanism being particularly adapted for use in connection with automatic drilling apparatus for drilling of wells, such as oil wells. This invention is a division of our copending application Serial Number 26,880, filed April 30, 1925.

In the copending application referred to, there is described an apparatus for automatically drilling wells by the so-called hydraulic rotary method. As a part of the said apparatus, there is employed a differential forming the subject matter of the present invention and said differential is intended to have the power applied to it directly to the work of planetating the intermediate gears of the differential while one of the other gears of the differential is driven at relatively high speed and one of the other gears of the differential is held nearly stationary, moving only to control the drilling action.

The differential mechanism is, therefore, subjected to an unusually severe action inasmuch as the normal operation of the mechanism requires the intermediate or pinion gears to be continuously planetated at relatively high speed.

An object of the present invention is to provide a differential gear mechanism of an improved type especially adapted for use where the intermediate or pinion gears of the differential may be subjected to rapid planetation under heavy loads.

Another object of the present invention is to provide a differential gear mechanism which is especially adapted for use in connection with automatic well drilling machinery.

In accordance with the present invention, a differential gear mechanism is provided which is compact in size and readily installed in a rotary drilling apparatus or other apparatus to be governed thereby. Moreover, the differential gear mechanism is adapted to be rotatively connected by means of flexible chain drives to a drilling apparatus or other mechanism. Furthermore, the differential of the present invention is so constructed that one of its driving shafts is adapted to act also as a main mounting or supporting shaft for the entire differential while the other driving shaft is constructed of quill form revolvable on the supporting shaft so that no other mounting means is necessary for the gearing and driving shafts of the differential except the one main driving shaft.

The invention and various other features, objects, and advantages thereof will best be understood from a description of a preferred form or example of a well drilling apparatus embodying the present invention. For this purpose, reference is made to the accompanying drawings illustrating one example of a differential gear mchanism embodying the invention.

Figure 2:
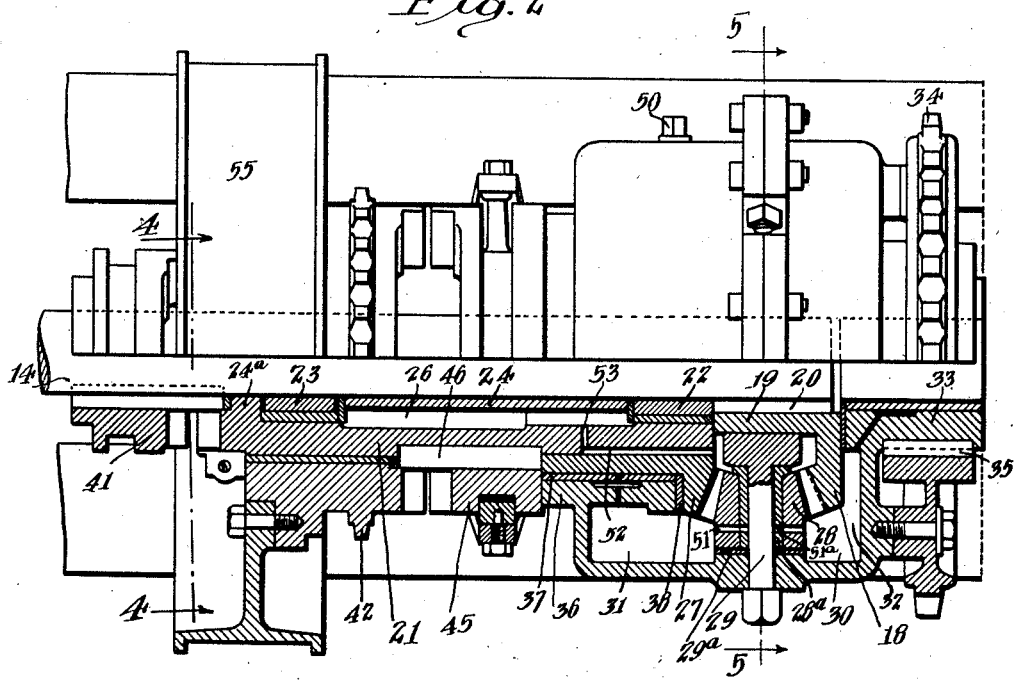
Figure 3:
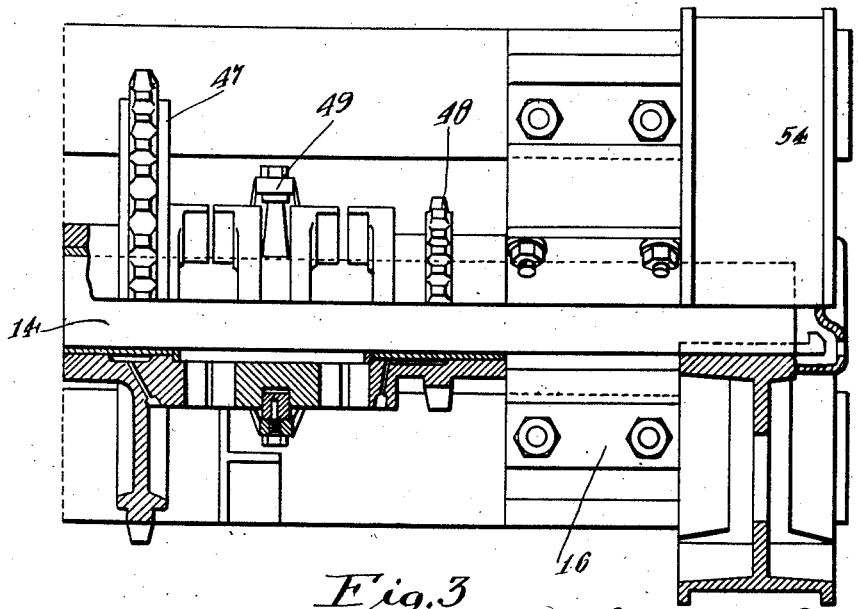
Figure 4:
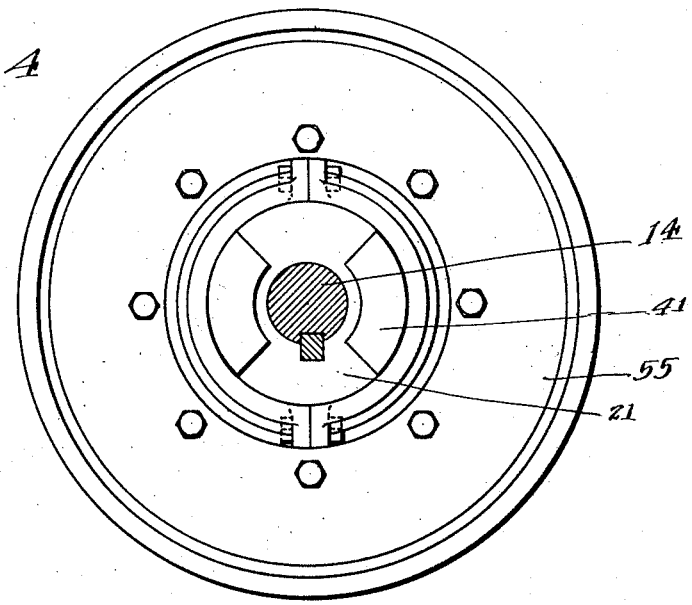
Figure 5:
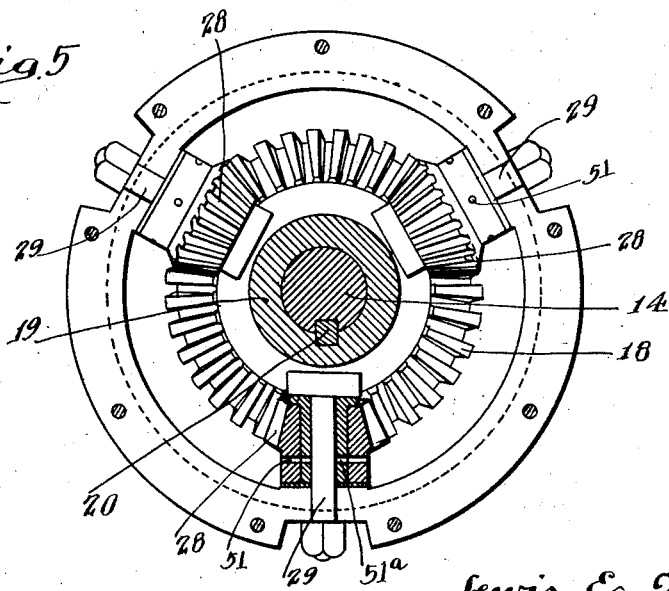

In the drawings:

Figure 1 is an elevation of an apparatus including a rotary draw-works, such as employed in an oil well drilling apparatus, connected to a differential gear mechanism embodying the present invention, Figures 2 and 3 together represent a complete longitudinal section of the differential, Figure 4 is a transverse section on line 4—4 of Figure 2, and, Figure 5 is a transverse section on line 5—5 of Figure 2.

Referring to the drawings, 7 indicates a hoisting drum forming a part of a rotary draw-works. 13 generally indicates a differential gear mechanism which is provided with a main shaft 14 supported at or near its ends by bearing blocks 15 and 16, respectively, mounted upon I-beams 17, affixed to the floor timbers 2 which, when the apparatus is employed as a rotary drilling apparatus, are part of the floor timbers of a derrick. The main shaft 14 serves to support the entire differential on the bearings 15 and 16 and thus act as a supporting member for the other operating parts of the differential and, in addition thereto, is itself one of the driving shafts of the differential. The shaft 14 carries a beveled gear 18 having a hub 19 acting as a collar by which the beveled gear 18 is rigidly held to the shaft 14 by a key 20.

21 indicates a second driving shaft of the differential which driving shaft is of quill form and is mounted on the main shaft 14 by roller bearings 22 and 23. These bearings are held spaced apart by a sleeve 24 therebetween. The inner end of the bearing 22 abuts the end of the hub 19 of the beveled gear 18 and the outer end of the bearing 23 engages an inturned flange 24$^a$ on the quill shaft 21 and the bearings are thus held from outward motion. The quill driving shaft 21 is provided with an enlarged bore 26 between the roller bearings 22 and 23 in order to provide a lubricant reservoir as will hereinafter be pointed out. As later pointed out, in operation the shaft 21 rotates rapidly relative to the supporting shaft 14 and the roller bearings 22 and 23 are preferred, as they are best adapted to withstand the stresses developed at high speed. It is understood, however, that the invention may take forms in which other devices or bearings are employed.

The inner end of the quill shaft 21 is keyed to a beveled gear 27 by which it is driven. The gears 18 and 27 mesh with the pinion gears 28. One or more of such pinion gears 28 may be provided, meshing with the beveled gears 18 and 27, the pinion gear or gears 28 being mounted upon a spider 29 which is secured to a gear housing or case 30. The pinion gears 28 are provided with bronze or roller radial thrust bearings 28$^a$ and 29$^a$, respectively. The gear housing or case 30 provides annular chambers 31 and 32, respectively, at both sides of the gearing for the reception of lubricant from which chamber the lubricant is conveyed through suitable holes and channels to all other parts of the differential and to the reservoir 26 provided by the quill shaft 21. One end of the housing or case 30 is provided with a hub 33 mounted by bronze or roller bearings on the main supporting shaft 14. The hub 33 also serves to mount a sprocket wheel 34 keyed thereon, as indicated at 35, and bolted to the sides of the gear housing or case 30. The sprocket wheel 34 is a driving member of the differential and is intended to be driven by a sprocket chain (not shown) from a suitable prime mover (not shown).

The other end of the gear housing or case 30 is provided with a hub 36 mounted through bronze or roller bearings 37 upon the hub of the beveled gear 27 carried by the quill shaft 21; said hub 36 also engages a bronze or roller thrust bearing 38 engaging the back face of the beveled gear 27 from which the end thrust of the beveled gear 27 and quill shaft 21 rigid therewith, is received.

The end of the quill shaft 21 is provided with a clutch face adapted to be engaged by a clutch face of a quill clutch 41, mounted on the main shaft 14 and keyed thereto. This clutch in operation may be utilized to lock the quill shaft 21 to the main shaft 14; the differential gearing is then frozen and the whole differential operates as a single rigid shaft.

Rotatably mounted on the quill shaft 21 near its left end is a sprocket wheel 42. This sprocket wheel 42 at its inner end has a clutch face engageable with the clutch face of a clutch 45; the clutch 45 abuts the end of the gear housing 30 and is slidably keyed upon the quill shaft 21, as indicated at 46. At the opposite side of the gearing, the main shaft 14 rotatably mounts two sprocket wheels 47 and 48, respectively, of different sizes and having clutch faces adapted to be selectively engaged by clutch faces of a double clutch 49 disposed therebetween and slidably keyed on the main shaft 14.

The gear housing 30 may have its chambers 31 and 32 filled with a lubricant through a plug 50. From the chambers 31 and 32, the entire bearings for the differential are lubricated, the lubricant passing from the chamber 31 through holes 51 of bearings 37 through holes 51$^a$ and bearings 28$^a$ and 29$^a$ and between the gears through channel 52 and radial ducts 53 to the chamber 26 formed by the enlarged bore of the quill shaft 21 from which it may pass to the high speed roller bearings of said shaft. In this manner, all of the lubricant can be supplied from one point to all of the bearings of the differential.

Preferably means are provided on each of the driving shafts 14 and 21 to impose an additional restraint to the rotation when desired. The preferred form of such means are brake drums 54 and 55 for the shafts 14 and 21, respectively. The brake drum 54 is keyed on the shaft 14 beyond the sprocket wheels 47 and 48 and the brake drum 55 is rigidly secured to the sprocket wheel 42 to be driven by the quill shaft 21.

The differential is shown as it is connected to the draw-works of a rotary drilling apparatus in which 56 is the customary line shaft. The line shaft is shown as revolvably mounting a collar 57 carrying two sprocket wheels 58 and 59. A chain 60 drives the sprocket wheel 58 from the sprocket wheel 42 driven by the quill shaft 21 of the differential and the sprocket wheel 59 is adapted to carry a chain (not shown) for driving or rotating the rotary table of the drilling mechanism (not shown). In performing this function, the line shaft is utilized merely as an axle for the sprockets 58 and 59 of this drive. The line shaft 56 also serves as a counter shaft between the differential 13 and the drum 7, permitting a plurality of changes in the ratios of the relative speeds of the main shaft 14 and the drum shaft 7. For this purpose, the sprocket wheels 47 and 48 are adapted to be selectively driven by the main shaft 14 through sprockets 64 and 65 on the line shaft 56, by means of chains 62 and 63, said sprocket wheels 64 and 65 being indicated as rigid with the line shaft 56. The connections between the line shaft 56 and hoisting drum 7 are the usual selective chain drives therebetween. In the ordinary form of a draw-works employed in a rotary drilling equipment, there is provided two or more selective chain drives between its line shaft and drum of which 66 and 67, respectively, indicate different drives and their respective chain sprockets and clutches. Line shaft 56 is indicated as disposed as usual with its axis parallel to the axis of the drum 7 of the draw-works and disposed thereabove. The differential 13 as described is of compact form and so constructed as to have both its driving connections directly through the medium of the customary line shaft and is thus adapted to be disposed close to the draw-works and with its axis parallel with the axes of the line shaft and drum. The different clutches of the apparatus are indicated as connected so they may be operated at a common operating point of the apparatus. For this purpose, there is provided a lever control locking plate 80 having ways and grooves therein for locking the levers 81, 82 and 83 in their different proper operating positions, the levers 81, 82 and 83 being employed to control the clutches of the differential. The lever 81 is connected by an arm 84 and reach rod 85 to a yoke 86 controlling the double clutch 49 which selectively engages the sprocket wheels 47 and 48. The lever 82 operates through rocker arm 87, reach rod 88, and yoke 89 to control the quill clutch 41 utilized in locking the quill shaft 21 to the main shaft 14 when it is desired to operate the differential as one rigid shaft. The lever 83 is connected by rocker arm 90, reach rod 91, and yoke 92, to clutch 45 which engages the sprocket wheel 42.

The operation of the differential gear mechanism thus described will depend upon the apparatus or mechanism to which the same is connected. The differential gear mechanism is particularly adapted to be used where it is necessary to planetate rapidly, the pinion gears 28. Preferably the pinion gears are in operation driven by suitable means, such as the sprocket 34 which will then impose upon the main shaft 14 and the quill shaft 21 equal force. The force applied to the quill shaft 21 is taken therefrom by the chain 60 while the two chain drives 62 and 63 provide a selective means through which the force on the main shaft 14 may be opposed. It will be observed that the differential gearing and its carried sprockets require no other mounting means than the main shaft 14, which extend through the gearing and is provided at opposed sides of the gearing with bearings. This shaft thus not only acts as a shaft driven by the differential gearing but as a shaft for supporting in a proper manner, all other elements of said gear. Either the main shaft or the quill shaft may be partially or totally braked or restrained from motion by the use of the brakes 55 and 54 which will operate as a control upon the apparatus and in addition thereto, the entire differential may be frozen so that it will rotate as a body by the operation of the clutch 41.

While the particular form of the differential gear mechanism herein described is well adapted to accomplish the purpose and objects of this invention, it is understood that various modifications may be made without departing from the spirit of the invention. This invention is not limited to the specific embodiment described for the purpose of illustrating the principles of the invention but includes all such modifications, changes, substitution and equivalents as come within the scope of the appended claims.

We claim:

1. In a device of the class described, the combination of a main shaft and bearings therefor, a quill shaft revolvable on the main shaft, differential gearing between said shafts and mounted upon the main shaft, a sprocket wheel revolvable on the quill shaft, a clutch for locking the sprocket wheel thereto, and a plurality of sprocket wheels revolvably mounted on and drivable by the main shaft.

2. In a device of the class described, the combination of a main supporting shaft, a quill shaft revolvable thereon, differential gearing connecting the shafts, sprocket wheels drivable by each of the shafts, and a brake drum operably connected with each of the shafts for restraining their rotation.

3. In a device of the class described, the combination of a supporting shaft, a quill shaft mounted thereon, sprocket wheels carried by the shafts, clutches for actuating the sprocket wheels, beveled gears carried by the shafts, a housing carrying a pinion gear engaging said bevel gears, and means for driving the housing revolvably around the axis of the supporting shaft.

4. In a device of the class described, a differential gearing, a shaft connected to the gearing and extending through the gearing and provided with bearings on opposed sides of the differential gearing so as to function as a main supporting shaft, another driven shaft being of quill form and revolvable thereon, and a housing carrying the pinion gearings, said housing providing a lubricant chamber entirely enclosing the differential gearing and in communication with bearings between the quill shaft and main shaft and bearings between the housing, main shaft and quill shaft.

5. In a device of the class described, the combination of a supporting shaft, a gear rigid with the shaft, a quill shaft revolvable on the supporting shaft, a gear carried by the quill shaft, a pinion gear engaging both of the above mentioned gears, and a housing carrying the pinion gear revolvable upon the axis of the supporting shaft and forming a lubricant supply chamber for bearings between the quill shaft and supporting shaft, and bearings between the housing supporting shaft and quill shaft.

Signed at Torrance, Calif., this 22d day of April, 1926.

LEWIS E. ZERBE.

Signed at Toledo, Ohio, this 16th day of April, 1926.

MERTON T. ARCHER.